United States Patent
Fennel et al.

(10) Patent No.: US 6,554,293 B1
(45) Date of Patent: Apr. 29, 2003

(54) METHOD FOR IMPROVING TILT STABILITY IN A MOTOR VEHICLE

(75) Inventors: Helmut Fennel, Bad Soden (DE); Lothar Kienle, Lampertheim (DE); Frank Kemmler, Eppstein-Bremthal (DE); Hans-Georg Ihrig, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/581,775

(22) PCT Filed: Nov. 25, 1998

(86) PCT No.: PCT/EP98/07602

§ 371 (c)(1),
(2), (4) Date: Oct. 18, 2000

(87) PCT Pub. No.: WO99/30942

PCT Pub. Date: Jun. 24, 1999

(30) Foreign Application Priority Data

Dec. 16, 1997 (DE) .......................... 197 55 761
May 14, 1998 (DE) .......................... 198 21 593
Jul. 6, 1998 (DE) .......................... 198 30 189

(51) Int. Cl.$^7$ ............................. B60G 17/005
(52) U.S. Cl. ................. 280/5.502; 280/5.506; 701/38
(58) Field of Search .......................... 280/5.502, 5.506, 280/5.507, 5.508, 5.511, 124.106, 124.107; 701/37, 38, 70, 72

(56) References Cited

U.S. PATENT DOCUMENTS 3,608,925 A  9/1971  Murphy
4,898,431 A  2/1990  Karnopp et al.
5,825,284 A  * 10/1998  Dunwoody et al. ......... 340/438

FOREIGN PATENT DOCUMENTS

| DE | 42 42 788 | 7/1993 |
|----|-----------|--------|
| DE | 42 27 886 | 2/1994 |
| DE | 42 29 967 | 3/1994 |
| DE | 196 02 879 | 9/1997 |
| DE | 196 23 595 | 12/1997 |
| DE | 196 24 795 | 1/1998 |
| DE | 196 32 943 | 2/1998 |
| DE | 197 08 508 | 3/1998 |
| DE | 197 46 889 | 5/1998 |
| EP | 0 758 601 | 2/1997 |
| EP | 0 770 527 | 5/1997 |

* cited by examiner

Primary Examiner—Paul N. Dickson
Assistant Examiner—Faye M. Fleming
(74) Attorney, Agent, or Firm—Rader, Fishman & Grauer PLLC

(57) ABSTRACT

A method for improving side roll, initially based on a conceivably unfavorable motor vehicle load to indicate a stability-critical transversal acceleration or related variable when the vehicle begins to travel. By observing the motor vehicle during travel, information on real mass distribution can be obtained. Whenever there is a danger of tilting during cornering, braking occurs in at least the front wheel that is located towards the outside of the bend, resulting in a reduction of lateral forces and transversal acceleration. An additional active motor vehicle suspension can also be provided.

11 Claims, 1 Drawing Sheet

METHOD FOR IMPROVING TILT STABILITY IN A MOTOR VEHICLE

TECHNICAL FIELD

The present invention relates to a method for improving the lateral tilt stability of a motor vehicle with at least two axles and two tracks.

BACKGROUND OF THE INVENTION

In his book "Fundamentals of Vehicle Dynamics", Society of Automotive Engineers, Inc., Warrendale 1992, Chapter 9, p. 309–333, T. D. Gillespie describes different models for roll-over accidents. The conditions for existing tilting risks are calculated beginning with a quasi-stationary model for a rigid motor vehicle and a quasi-stationary model for a resilient motor vehicle up to dynamic models and taking into consideration the natural roll frequency.

When the book was published, it was already known that lorries, trucks, buses, minibuses and off-road vehicles in case of cornering with a large roll movement present a tilting risk due to an elevated center of gravity and/or small track widths, but only recently resulted, that also passenger cars—particularly in case of sinusoidal steering movements—may build up oscillations which increase to such an extent that they tilt. Such a danger of tilting is increased considerably by inappropriately loading the vehicle, i.e., only on one side or on the vehicle roof, because the position of the mass center of gravity of the motor vehicle is displaced upwardly or to one side.

DE-A 197 46 889 discloses a system for increasing the lateral stability in case of cornering which is provided with a device for detecting the inclination. Said device either measures the level difference between the right and the left side of the vehicle or the transversal acceleration of the vehicle in order to detect the roll angle between the vehicle level and the road level. If said device recognizes a tilting risk, braking the front wheel that is located towards the outside of the bend causes a correcting yawing moment.

As already described above, the admissible transversal acceleration as well as the admissible roll angle depend on the position, in particular the level of the center of gravity of the motor vehicle.

It is thus the object of the present invention to provide a method reacting appropriately to the danger of tilting even in consideration of an unfavorable load.

This object is achieved by not considering the center of gravity of the empty motor vehicle at the beginning of the travel, but the most unfavorable center of gravity of the motor vehicle taking into consideration the admissible vehicle load when a stability threshold is calculated. The stability threshold can be a transversal acceleration or a value correlating with this, for example a yawing rate. But the decision to use the transversal acceleration instead of the yawing rate has the advantage that a metering device for the transversal acceleration which is installed in the vehicle automatically takes into consideration lateral road inclinations, e.g. in super-elevated curves.

The mass distribution existing in the vehicle at the beginning of the travel will not change very much during travel: the passengers might change their seats and the tank level of the vehicle falls. But these are only small and/or slow changes in comparison to the vehicle mass. During travel the sensor technology of the vehicle can make further observations concerning the acceleration and deceleration behavior which serve as a basis for a more precise calculation of the real position of vehicle's center of gravity.

DETAILED DESCRIPTION OF THE PREFERRED EMBODIMENTS

Figure 1:
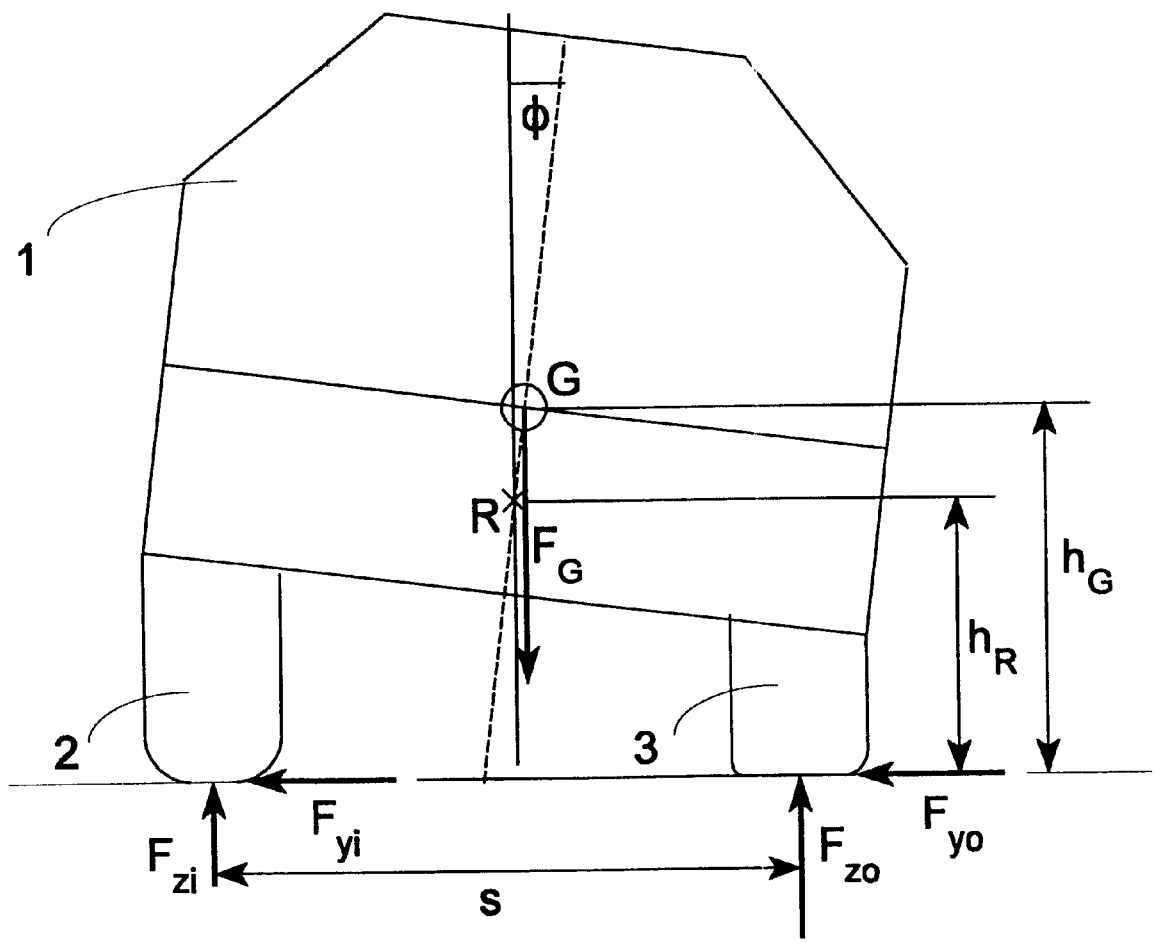
FIG. 1 is a schematic representation of a four-wheel motor vehicle from behind when driving in a left-hand bend.

The following variables are shown in the drawing:

| | |
|---|---|
| G | center of gravity of the motor vehicle 1 |
| $h_G$ | level of the center of gravity M |
| R | rotational center of a roll movement of the vehicle |
| $h_R$ | level of the rotational center R |
| s | track width of the vehicle 1 |
| $\phi$ | roll angle |
| $F_G$ | gravitational force of the vehicle 1 |
| $F_{yi}$ | lateral force on the wheel that is located towards the inside of the bend 2 |
| $F_{zi}$ | vertical force on the wheel that is located towards the inside of the bend 2 |
| $F_{yo}$ | lateral force on the wheel that is located towards the outside of the bend 3 |
| $F_{zo}$ | vertical force on the wheel that is located towards the inside of the bend 3 |

The following considerations are made without restricting the universal validity for the vehicle 1 when driving in a left-hand bend. In order to be applicable in the same degree to a right-hand bend, the terms of the following equations have to be provided with signs, which has been omitted for reasons of clarity.

The wheel 2 located towards the inside of the bend begins to lift off the ground if the lever moments acting on the center of gravity around the wheel tread of wheel 3 located towards the outside of the bend 3, which is in this case considered as a point, counterbalance each other. Counter-clockwise this means for a small $\phi$ and m as vehicle mass:

$$m*g*[s/s-\phi*(h_M-h_R)]$$

with g=9.81 m/s².

Clockwise the virtual centrifugal force is $-F_y=-a_y*m$ causing the lever moment:

$$-m*a_{ycrit}*h_M$$

Equating the lever moments, substitution of $\phi$ by means of $R_\phi$, the dimensionless roll rate $\phi*g/a_y$ indicating the change of the roll angle $\phi$ (in radius) together with the transversal acceleration (in multiples of g) and solution for $a_{ycrit}$ results in the following condition for the critical transversal acceleration which causes the wheel located towards the inside of the bend to lift off:

$$aykrit = \frac{g*s}{2h_M} * \frac{1}{1+R_f(1-h_R/h_M)}$$

The critical transversal acceleration is thus the smaller the higher the center of gravity is lying over the roll rotation center. Thus the position of the center of gravity is important for statements on the lateral stability.

This simple calculation of the critical transversal acceleration is only valid in quasi-stationary cases. In case of dynamic steering maneuvers with excursions similar to vibrations the vehicle may build up oscillations. Therefore a stabilizing system should have its entry threshold value $a_{yon}$ already in case of smaller transversal accelerations:

$$a_{yon} = d * a_{ycrit}$$

with $0<d<1$.

The exit threshold from a stabilizing control is defined analogously:

$$a_{yoff} = e * a_{ycrit}$$

with $0<e<d$.

An additional variable for recognizing the danger of tilting may also be the change, i.e. the time derivative $å_y$ of the transversal acceleration $a_y$ by which the build-up of oscillations may be recognized, in particular in case of maneuvers with changing dynamics. Exceeding a threshold value $å_{yon}$ which depends on the real and the critical transversal acceleration can be introduced as an AND-condition for taking stabilizing measures:

$$a_y > a_{yon}$$

and $$å_y > å_{yon}$$

Or a general consideration may be made including a stability condition according to:

$$i*a_y + j*å_y < a_{ycrit}$$

with i, j being parameters specific to the vehicle that have been defined empirically, i being dimensionless and j having the dimension of a time. As soon as $$i*a_y + j*å_y > a_{ycrit}$$

is valid, a stabilizing measure is taken. Certainly also a square form or another form may be chosen instead of a linear relationship. The most adequate relationship will be defined by a series of tests, if necessary.

According to the chosen entry condition the following exit condition is valid:

$$a_y < a_{yoff}$$

and $$å_y < å_{yoff}$$

whereby $$å_{yoff} = f * å_{yon}$$

and $0<f<1$; or $$i*a_y + j*å_y < k*a_{ycrit}$$

with $0<k<1$;
or a more complex criterion.

A high transversal acceleration is given if large lateral forces are transmitted between tire and roadway. The friction in the tread contact area, i.e. in the contact surface between roadway and tire defines the entity of the transmittable horizontal force. The vector sum resulting from longitudinal force and lateral force cannot exceed the maximum force defined by the friction coefficient. A control intervention may be carried out which increases the longitudinal force by means of braking, thus reducing not only the maximum transmittable lateral force, but also a dangerous transversal acceleration. The motor vehicle will then adopt an understeering behavior and follow a bigger curve radius.

A stabilizing control intervention comprising an active, i.e. automatic brake actuation, in any. case will brake the front wheel located towards the outside of the bend. On the one hand, the vehicle side located towards the outside of the bend is more stressed when cornering, while the front axle is more stressed in case of braking. Thus the front wheel located towards the outside of the bend can transmit considerably higher forces between tire and roadway than the other wheels so that one can expect the biggest effect in this case. On the other hand the force vector of the longitudinal force built up on the front wheel located towards the outside of the bend bypasses the center of gravity of the motor vehicle on the side located towards the outside of the bend thus supporting stability. A similar supporting effect can be observed on the rear wheel located towards the outside of the bend. Caution is advised, however, if the vehicle is not equipped with an anti-blocking system, because—as is generally known—the vehicle tail may be caused to swerve, if the outer rear wheel that is more stressed blocks before the front wheels. The longitudinal force vector of the front wheel located towards the inner side of the bend only shows to the side of the center of gravity that is located towards the outside of the bend, if the steering wheel is turned extremely so that the longitudinal force normally acts against the stabilization, which however is only of small importance due to the lateral force which is reduced in turn. It is of no advantage to the lateral stabilization to brake the rear wheel located towards the inside of the bend since this wheel is stressed only to a small degree, thus playing only a minimum role with regard to the lateral force transmission, additionally shows a longitudinal force vector with an unfavorable course and would favor the swerving tendency in case of blocking.

In principle a total loss of the side guidance should not be caused since in this case the vehicle simply slips off the road which, of course, is no desirable alternative to the tilting of the vehicle.

If a critical transversal acceleration is recognized during a braking operation induced by the driver, the existing brake forces have to be redistributed taking into consideration the desired lateral force reduction, whereby the total braking moment must not be reduced. As long as the wheels remain on the ascending section of the known $\mu(ё)$-curve, an increase of the braking power is uncritical. When reaching the maximum value it has to be considered, however, that a further increase of the brake pressure causes a loss of the brake moment, even if it is small.

For the above reasons it is recommended to have the brakes reduce the lateral forces only on the linear ascending section of the $\mu(ё)$-curve below saturation, i.e. in the so-called partial braking area.

Additionally, an active vehicle suspension may be foreseen which compensates the roll angle at least partially by lifting the side of the vehicle located towards the outside of the bend. Such systems have been developed, e.g. for trucks and busses.

At the beginning of the travel a value is assumed as stability threshold for the transversal acceleration which guarantees that tilting can most probably be prevented, if physically possible, by means of a control intervention and with any load that is legally admissible. In the course of the travel conclusions may be drawn with regard to the location of the center of gravity by observing the wheel sensor signals which possibly permit increasing said threshold.

Provided that the driving torque generated by the driving motor during acceleration is known, the drive power, i.e. the longitudinal force between tire and roadway, can be calculated. The wheel sensors preferably of non driven wheels detect the achieved vehicle speed from which the vehicle acceleration can be derived by means of time derivative. The vehicle mass is the result of the acceleration divided by the driving power. The known vehicle-specific mass of all parts which are not spring-loaded is subtracted in order to consider the mass m moved in case of a roll or pitch movement.

Similar observations are certainly possible also during the braking operation with regard to the vehicle deceleration, whereby a defined brake power is assigned to a brake pressure.

The deceleration of a motor vehicle can also be used to infer the existing mass shift, i.e. the pitch angle of the vehicle, from slip differences on the front and rear axles for given decelerations. With known elasticity values in the vehicle suspension and a known spring-loaded mass m the level $h_m$ of the center of gravity can be calculated on the basis of the pitch lever moment. In case of vehicles with four-wheel drive, the slip differences on front and rear axle can also be established on the basis of the acceleration.

The determined level of the center of gravity can then be inserted into the equation for calculating the critical transversal acceleration $a_{ycrit}$ in order to modify with this the entry threshold value $a_{yon}$ or a more complex entry condition.

This method of determining the center of gravity can be used either immediately at the beginning of the travel during the first acceleration and brake maneuvers, repeated after certain time intervals or during each suitable brake operation and/or acceleration (preferably without turning the steering wheel).

If the vehicle is provided with a system for controlling the yawing moment, said system should be modified in some way. A yawing moment control regulates the yawing rate of a vehicle with regard to a nominal value. Said nominal value is usually limited to a physically sensible value. But the physical considerations in general take into account only the friction coefficient conditions of the road surface: in case of a high friction coefficient the maximum nominal yawing rate to be fixed is higher than in case of a low friction coefficient. In case of a high friction coefficient, however, the tilting danger is higher due to large transmittable lateral forces. The nominal yawing rate should thus be limited in consideration of the critical transversal acceleration and/or the entry threshold for the lateral stability control. This is in particular critical in case of systems which counteract not only to an oversteering tendency, but also to an excessive understeering tendency. While trying to prevent an oversteering in principle reduces also a tilting danger, trying to prevent an understeering can cause or support a tilting danger. Therefore in case of doubt, the increase of the lateral tilting stability should have priority over avoiding the understeering.

A brake system which realizes the method of side stabilization according to the present invention must provide the possibility of braking actively the individual wheels. That means, that at least on the single front wheels the brake has to be actuated without intervention of the driver. This condition is given e.g. in case of motor vehicles with front wheel drive and drive slip control. Small modifications with regard to the valve arrangement permit the active braking of each of the wheels. But also vehicles provided with a system for controlling the yawing moment by means of a brake intervention, are equipped for active braking, usually individually for each wheel. Anti-blocking systems, on the other hand, normally depend on the brake pedal in order to build up brake pressure.. Said systems can, for example, be equipped with an active brake power booster or a self-priming pump linked to the brake fluid tank, and a stop valve in the brake conduit. It may also be recommended to ensure a control of the individual wheels of the rear axle brakes by additional valves, if necessary.

What is claimed is:

1. Method for increasing the lateral tilt stability of a vehicle with at least two axles and at least two tracks in which measures are taken for preventing the side roll, comprising the steps of:
    A) comparing a variable correlating with the transversal acceleration of the vehicle against a first threshold value wherein the threshold value represents, at least at the beginning of the travel, the lowest value which leads to tilting risk in case of any admissible load of the vehicle,
    B) introducing stabilizing measures when the comparing of step (A) is affirmative, further including the step of:
        observing the reaction of the vehicle to changes in speed, and adjusting the first threshold value or a second threshold value of the level of the center of gravity of the vehicle.

2. Method according to claim 1, wherein the correlating variable is the transversal acceleration in one point which corresponds approximately to the location of the vehicle's center of gravity in an unloaded vehicle.

3. Method according to claim 1, the correlating variable is a function resulting from the vehicle's transversal acceleration and the time derivative.

4. Method according to claim 1, wherein the stabilizing measures are interrupted if the first threshold value or the second, lower threshold value are not exceeded.

5. Method according to claim 2, wherein the step of determining the transversal acceleration of the motor vehicle is conducted on the basis of the signals generated by the wheel sensors.

6. Method according to claim 1, wherein the transversal acceleration of the motor vehicle is determined by a steering angle signal and signals of the wheel sensors.

7. Method according to claim 1, wherein said stabilizing measure includes activating a brake on the front axle.

8. Method according to claim 1, wherein said stabilizing measure includes activating the vehicle suspension.

9. Method according to claim 1, wherein said stabilizing measure includes activating a measure for preventing the side roll with higher priority over activating a measure for preventing excessive understeering.

10. Method for increasing the lateral tilt stability of a vehicle with at least two axles and at least two tracks in which measures are taken for preventing the side roll, comprising the steps of:
    A) comparing a variable correlating with the transversal acceleration of the vehicle against a first threshold value wherein the threshold value represents, at least at the beginning of the travel, the lowest value which leads to tilting risk in case of any admissible load of the vehicle,
    B) introducing stabilizing measures when the comparing of step (A) is affirmative, wherein said stabilizing measure includes activating a brake on the front axle.

11. Method for increasing the lateral tilt stability of a vehicle with at least two axles and at least two tracks in which measures are taken for preventing the side roll, comprising the steps of:
    A) comparing a variable correlating with the transversal acceleration of the vehicle against a first threshold value wherein the threshold value represents, at least at the beginning of the travel, the lowest value which leads to tilting risk in case of any admissible load of the vehicle, B) introducing stabilizing measures when the comparing of step (A) is affirmative, wherein said stabilizing measure includes activating a measure for preventing the side roll with higher priority over activating a measure for preventing excessive understeering.

* * * * *

UNITED STATES PATENT AND TRADEMARK OFFICE
CERTIFICATE OF CORRECTION

PATENT NO.     : 6,554,293 B1                                        Page 1 of 1
DATED          : April 29, 2003
INVENTOR(S)    : Helmut Fennel et al.

It is certified that error appears in the above-identified patent and that said Letters Patent is hereby corrected as shown below:

Column 6,
Line 27, please change "claim 1, the correlating" to -- claim 1, wherein the correlating --.

Signed and Sealed this

Eighth Day of July, 2003

JAMES E. ROGAN
*Director of the United States Patent and Trademark Office*